Nov. 7, 1944.  P. E. SHIELDS  2,362,101

BANKING DEPOSIT-TICKET DEVICE

Filed Feb. 15, 1944

INVENTOR
Paris E. Shields
BY
ATTORNEY

Patented Nov. 7, 1944

2,362,101

UNITED STATES PATENT OFFICE 2,362,101

BANKING DEPOSIT-TICKET DEVICE

Paris E. Shields, New York, N. Y., assignor to Checkmaster Plan Inc., New York, N. Y., a corporation of New York Application February 15, 1944, Serial No. 522,417

1 Claim. (Cl. 282—27)

My present invention relates generally to banking accessories, and has particular reference to a deposit-slip device of novel character.

A general object of my invention is to provide a means for simplifying and speeding up normal banking procedures, and for coordinately effecting savings in time, labor and expense. The manner in which my present invention contributes toward the achievement of this general objective will be more readily appreciated by a brief reference to customary and traditional procedures.

Ordinarily, a bank's customer is furnished with a pass book, and whenever he makes a deposit the total is entered in the pass book by the teller. With the items deposited, the customer submits a deposit slip which lists the various cash or check items which make up the total. At periodic intervals, usually monthly, the bank returns to the customer the cancelled checks which were drawn during that period, together with a statement showing all deposits made, all charges against the account, and the balance remaining.

Upon analysis, it is clear that the periodic statement can be simplified by omitting an itemization of those charges which are brought about by checks which have been drawn, since the cancelled checks themselves serve as such itemization, so far as the customer is concerned. Similarly, an itemization of deposits can be omitted from the statement if the original deposit slips themselves are returned to the customer with the cancelled checks. In fact, a number of banks have heretofore adopted this "short form" of statement. It is subject, however, to the disadvantage that the bank, by divesting itself of the original deposit-tickets, is left with no authentic record of the deposits made, unless it makes photographic copies of these deposit-tickets before returning them to the customer. This is a relatively expensive, and time-consuming process.

Moreover, regardless of the rendition of the conventional long form statement or the simplified short form statement, ordinary banking practice requires a further procedure—not usually realized by laymen—in connection with the distinction that must be made by the teller between cash deposits and check deposits. Since the cash remains with the teller and is always to be accounted for by him, while the check items are transmitted to the bookkeeping department or clearing division along with the deposit slip, it is necessary for the teller to make an independent entry of some sort to justify and verify the cash on hand. This is usually accomplished by means of a "teller's cash record" or "cash ticket" which he must fill out as a separate procedure. In some banks, he retains this "cash record" and merely circles or otherwise indicates on the deposit ticket (when it is transmitted to the bookkeeper) the item or items which represent cash. In other banks, the "cash record" is also forwarded to the bookkeeper in which case the teller must make a second notation on a "tally sheet" or the like, which is retained by him.

My present invention is of such a character that the foregoing procedures may be greatly simplified. It affords an opportunity not only to eliminate the pass book entirely, and to eliminate at least one independent "cash record" entry to be made by the teller, but it also lends itself admirably to the procedural system in which the aforementioned "short form" periodic statement to the customer is employed.

While the present device is extremely simple in structure and design, it has far reaching effects in an over-all simplification of banking practice. It consists essentially of a flat element doubled upon itself to define superposed blanks, these blanks bearing certain markings in predetermined relationships and being provided with lines of weakness in predetermined regions, so that a single series of notations made by the depositor, in the well known manner customarily employed in filling out an ordinary deposit-ticket, will condition the device for severance into three separate correlated elements, one of which is a deposit-ticket, another of which is a customer's receipt, and another of which is a bank record which serves the double purpose of a "teller's cash record" and an authentic duplicate itemization of deposits.

I achieve the foregoing general objects and advantages, and such other objects and advantages as may hereinafter appear or be pointed out, in the manner illustratively exemplified in the accompanying drawing, in which:

Figure 1 is a view of the obverse face of a flat sheet of which a preferred embodiment of the present invention is formed;

Figure 2 is a similar view of the reverse face;

Figure 3 is a perspective view showing the sheet doubled upon itself to form a device of the present character, and showing some illustrative entries or notations made by a customer; and Figures 4, 5 and 6 are plan views, respectively, of the three separate elements that ultimately result.

The sheet of material employed for the present purpose is substantially rectangular, and may be composed of any suitable material such as paper or light cardboard. A hinge line 10 extends transversely across the sheet, thereby dividing it into two panels or blanks 11 and 12. For a purpose presently to be described, the blank 11 is somewhat larger than the blank 12 so that when the sheet is doubled upon itself along the hinge line 10, as indicated in Figure 3, the lower portion of the blank 12 extends beyond the lower edge of the blank 11.

The side of the sheet shown in Figure 1 has been described as the obverse side because when the sheet is doubled upon itself, the face of the blank 11 shown in Figure 1 is presented forwardly as shown in Figure 3. It will be observed that this blank has various markings thereon, defining spaces in predetermined relationship within which the customer makes his notations. Thus, on the upper region of the blank 11 a set of markings are provided which define spaces 13 and 14 in which items to be deposited are enumerated. The space 13 is entitled "cash" and the customer enters therein the sum of money which he is depositing in cash. For illustrative purposes, I have shown a notation "$100.20." In one or more of the spaces 14, the customer lists the item or items which he is depositing in the form of a check or checks; and I have illustratively shown an item of this character in the form of a notation "$32.50."

Above these spaces there may be a marking 15 which designates the bank with whom the customer has the account, and a space 16 within which the customer is directed to insert his account number, assuming that the bank employs numbered accounts. If the bank's accounts are not designated by numbers, this space might be employed for the customer's name or other notation of identity.

The markings thus far described constitute a set which terminates at the transverse line 17 and which is arranged on the upper region of the top blank 11. On the lower region of the top blank, there is a second set of markings which defines a space 18 in which the total deposit is to be entered (illustratively filled in by the notation "$132.70"), a space 19 to receive a name notation as to the customer's identity (illustratively filled in with the name "John Doe"), and a space 20 for the date.

The upper surface of the nether blank 12 is preferably provided with a similar and corresponding set of markings and spaces. These are shown most clearly in Figure 2 and include, for example, a space 21 corresponding to the space 16, spaces 22 and 23 corresponding to the spaces 13 and 14, and spaces 24, 25 and 26 corresponding to the spaces 18, 19 and 20.

Directly beneath the line 17 of the blank 11, the blank 12 is provided with a line of weakness 27 which extends transversely across the blank and may be formed by scoring, by perforations, or in any other convenient manner. This line of weakness, along with the hinge line 10 which may be similarly weakened, if desired, furnishes a convenient means for ultimately severing the ticket into three separate elements.

It will be observed that the line 27 is so arranged that it divides the nether blank 12 into upper and lower sections, the upper section lying directly beneath the set of markings 13-16, the lower section lying directly beneath the set of markings 18-20.

The lower section of the nether blank 12 is additionally provided with a marking 28 which designates the bank, and with a marking 29 on which the bank teller may sign his name or apply a rubber stamp or other validating notation.

Between the top and nether blanks 11 and 12 a means is provided for automatically duplicating on the nether blank any notations which are placed on the top blank. One convenient way of accomplishing this is to coat the rear face of the blank 11 with a carbonaceous material as indicated by the shaded area 30 in Figure 2. Thus, when the customer makes his notations on the top blank 11, as indicated in Figure 3, corresponding notations will be made in corresponding regions on the nether blank 12, and it will be observed that the line of weakness 27 is so arranged that it lies between the set of appropriately designated spaces 22 and 23 (in which there is an itemization of the deposit, including the cash deposited), and the set of appropriately designated spaces 24 and 25 (to receive notations as to the depositor's identity and the total amount of his deposit).

When the customer submits the filled-in blank to the teller along with the items which he wishes to deposit, the teller examines the notations on the blank 11 to make sure that they are consistent and legible, and if he finds them to be in order he simply signs his name or affixes an authenicating seal or mark to the space 29 on the blank 12. He then separates the blank 11 from the blank 12, by tearing along the hinge line 10, and splits the nether blank 12 into upper and lower sections, by tearing along the line 27. The lower section of the latter blank (shown most clearly in Figure 6) is immediately returned to the customer and serves as the customer's receipt. As shown most clearly in Figure 6, this section bears the additional receipt-acknowledging notation 31. The blank 11 (shown in Figure 4) is then utilized as an ordinary deposit-ticket and in accordance with regular practice, this ticket accompanies the checks to the bookkeeping department. The upper portion of the blank 12 (shown in Figure 5) is a bank record which may be utilized in various ways. Its primary role is a "teller's cash record" and in this respect, it may be retained by the teller which his cash (in which case he may circle the cash item "$100.20" on the deposit-ticket when he transmits the latter to the bookkeeper) or it may be transmitted to the bookkeeper along with the deposit-ticket and the checks (in which case the teller makes his usual entry on a tally sheet or the like which remains in his possession). In either case, he is saved the time and effort which would ordinarily be required in filling out a separate "cash ticket." Its secondary role is to serve as a bank record which contains (in the depositor's own handwriting) an itemized list of the deposit or deposits made, and this permits the bank at the end of the month or other accounting period to return the deposit-ticket of Figure 4 to the customer along with his statement, without leaving the bank completely divested of any itemized record and without requiring the bank to make a photographic or other copy of the original deposit-ticket.

It will then be seen that the present device, while extremely simple in structural nature and plan of arrangement, greatly facilitates the routine involved. The depositor is not put to any extra trouble, since he ordinarily fills out a deposit-ticket in any event. The depositor receives a receipt at the time of deposit which is completely satisfactory to him and which thus obviates the necessity for a pass book or a duplicate deposit-ticket. The bank has an original deposit-ticket which may be routed in the usual way during the bookkeeping procedure. The teller has a ready-made cash record which relieves him of the necessity for making one out himself. And the bank has on hand a record of itemized deposits which permit the ultimate return to the customer of the original deposit-ticket along with a short form statement.

It will be understood that, except as to the principal relationship of parts as hereinbefore described, the shape and proportions of the present device may be of any suitable or desired character, and the markings may be modified to suit the particular requirements of the bank which employs it. In general, it will be appreciated that the details herein described and illustrated are purely illustrative, and that they may be changed by those skilled in the art without departing from the spirit and scope of the invention as expressed in the appended claim.

Having thus described my invention and illustrated its use, what I claim as new and desire to secure by Letters Patent is:

A banking deposit-ticket device comprising a flat element doubled upon itself to define superposed blanks of different lengths, the top blank having appropriately designated spaces on the upper region thereof to receive notations as to the cash and checks deposited, said blank having in the lower region thereof a single space for indicating the total deposit, as well as appropriately designated spaces to receive notations as to the depositor's identity, the nether blank having substantially the same designated spaces in position for registry with the aforesaid spaces on the top blank, means between the blanks for automatically duplicating said notations on the corresponding spaces on the nether blank, and a weakened line on said nether blank arranged between (a) the spaces intended to receive the notations as to cash and checks deposited and (b) the spaces intended to receive the notations as to the depositor's identity and said single space for indicating his total deposit, whereby a separation of said blanks from each other and a splitting of the nether blank along said weakened line will provide correlated pieces constituting a deposit-ticket, a teller's record, and a depositor's receipt, the top blank being the deposit-ticket, the upper section of the nether blank being the teller's record of itemized deposits including a cash record, the lower section of the nether blank being the depositor's receipt, said depositor's receipt on the nether blank having a space projecting beyond the end of the top blank and bearing receipt-acknowledging indicia on said projecting portion to afford space for validation by the teller.

PARIS E. SHIELDS.